Figure 1:
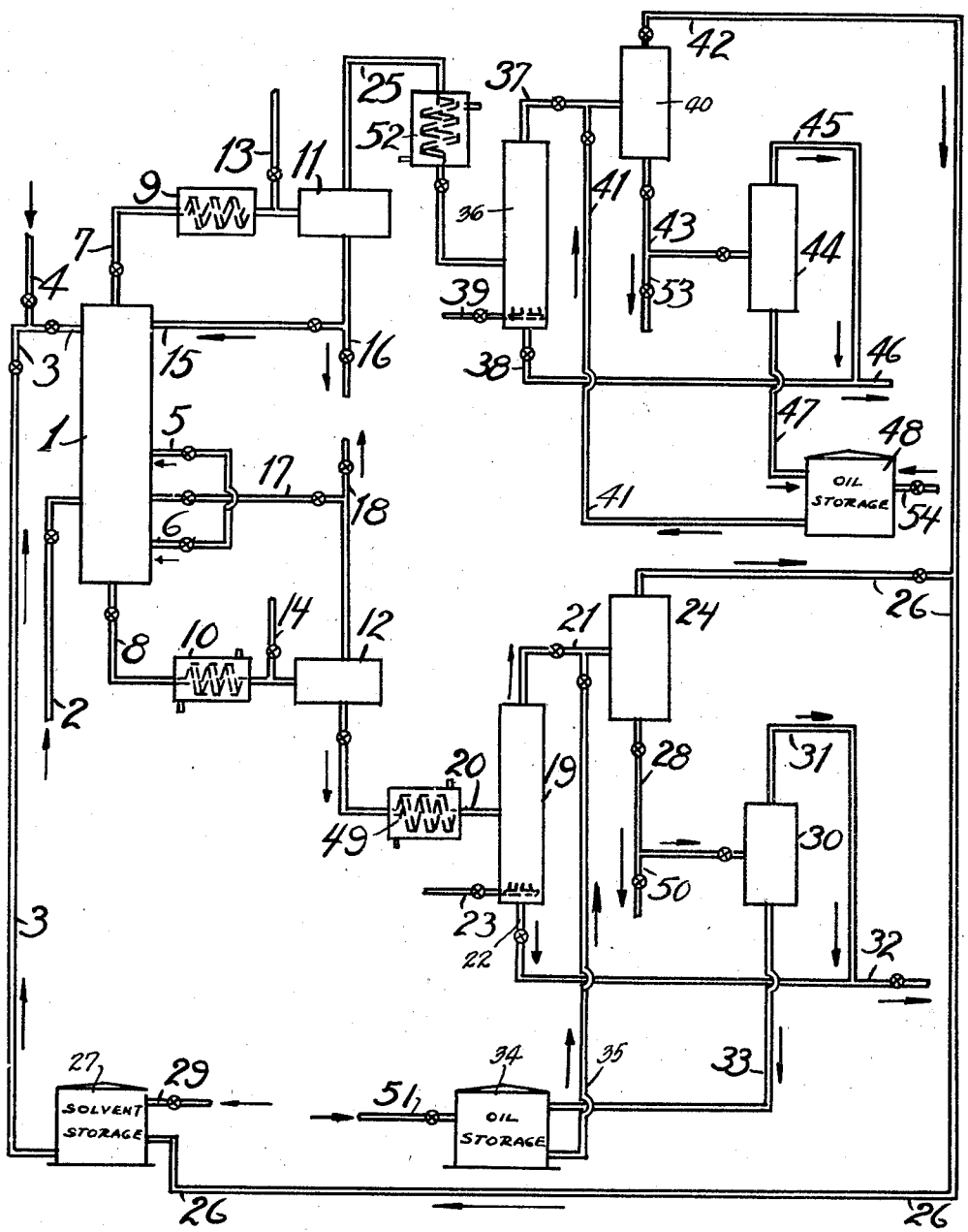

Dec. 15, 1942.  F. W. SCHUMACHER  2,305,038
SOLVENT TREATING PROCESS
Filed Sept. 16, 1939  3 Sheets-Sheet 1

Frederick W. Schumacher Inventor
By P. L. Young  Attorney

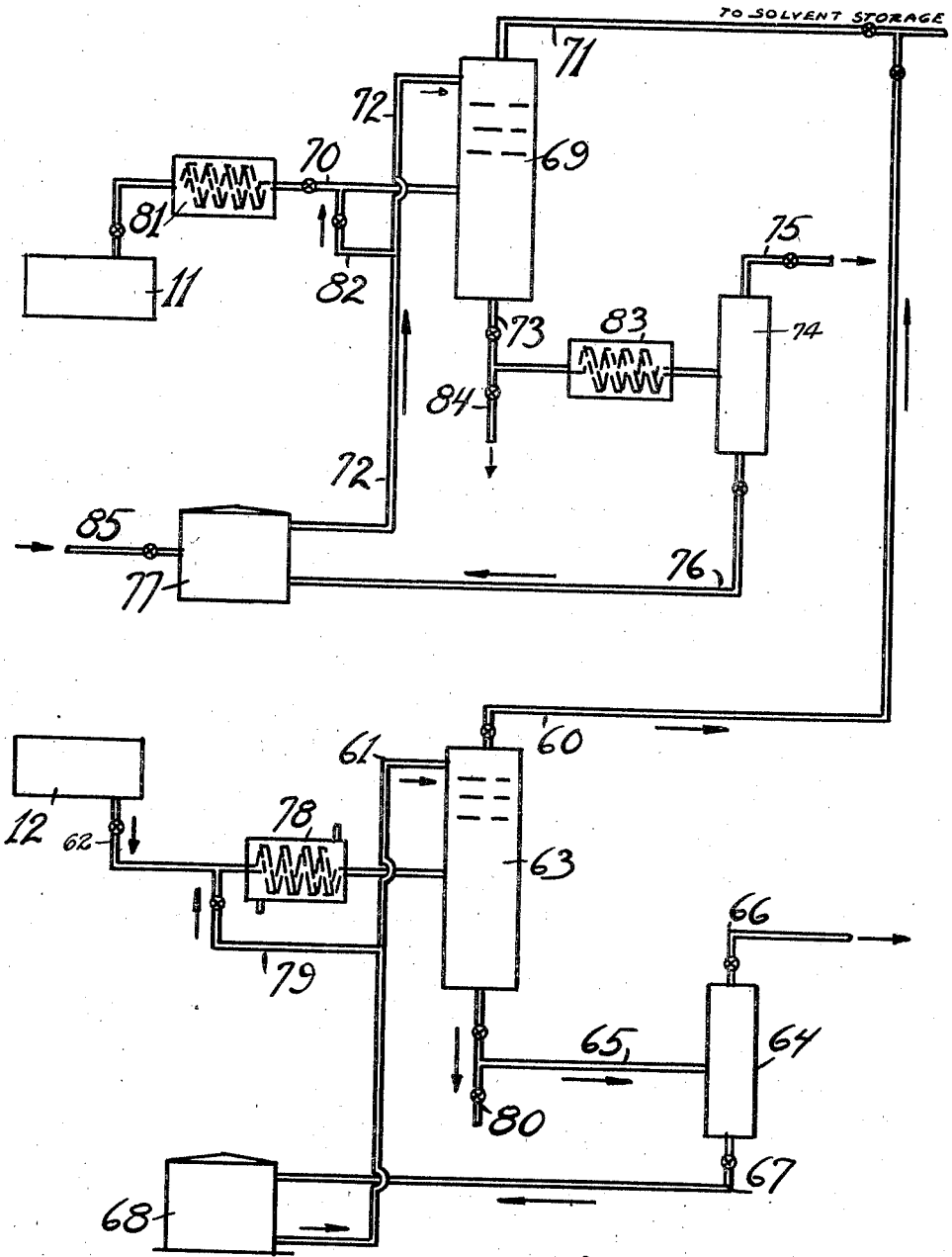

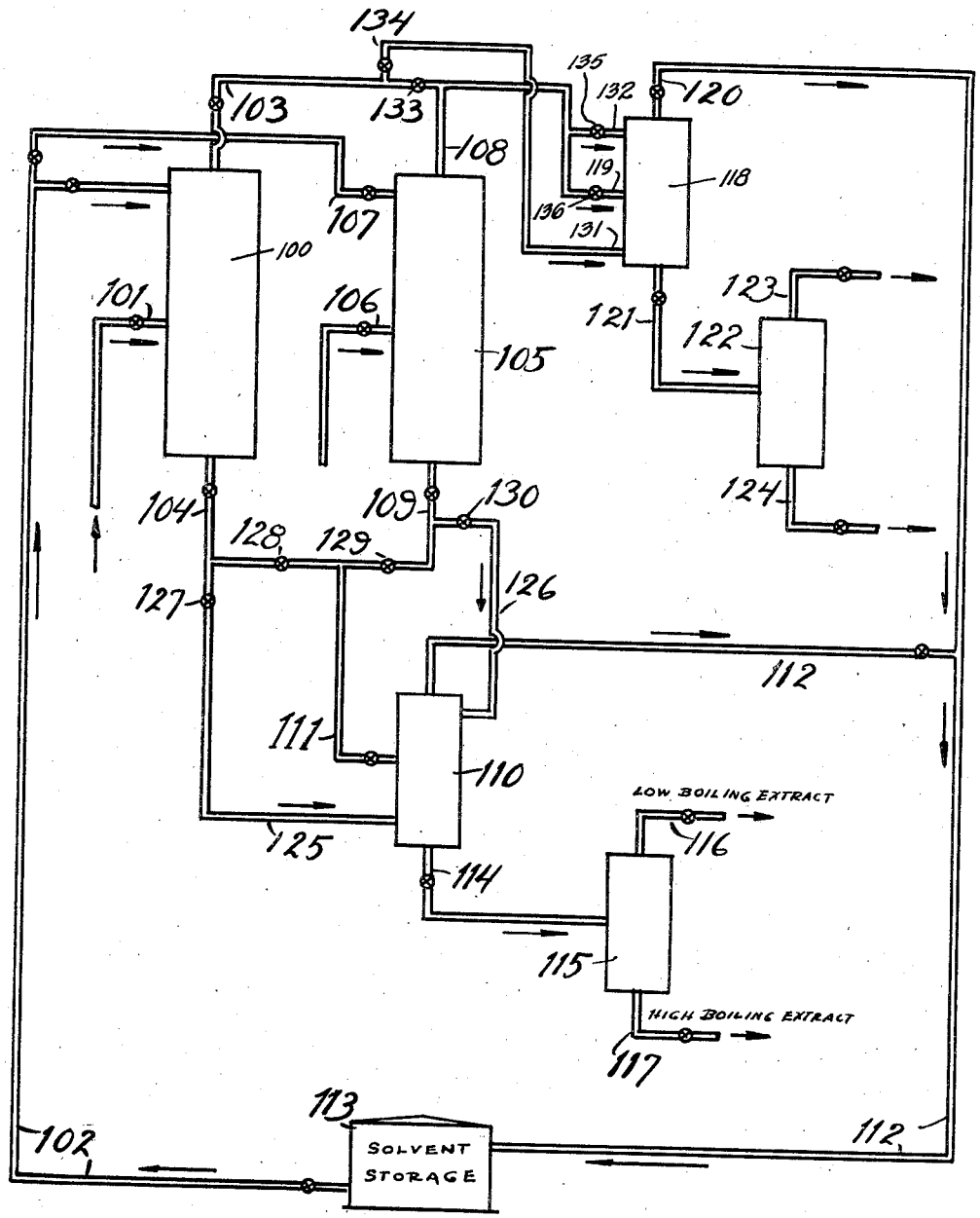

Patented Dec. 15, 1942

2,305,038

UNITED STATES PATENT OFFICE 2,305,038

SOLVENT TREATING PROCESS

Frederick W. Schumacher, Mountainside, N. J., assignor to Standard Oil Development Company, a corporation of Delaware Application September 16, 1939, Serial No. 295,163

8 Claims. (Cl. 196—13)

The present invention relates to the solvent treatment of mineral oils. The invention is especially concerned with a process for recovering the selective solvent free of mineral oil from the respective phases. In accordance with the present process the relatively lower boiling oil remaining in the selective solvent as an impurity is removed by treating with a relatively higher boiling oil. The mixture is distilled to remove overhead the selective solvent free of oil impurities and to remove as bottoms the relatively lower boiling oil and the relatively higher boiling oil.

It is well known in the art to treat mineral oils, particularly petroleum oils with various selective solvents which have the ability to segregate the relatively more aromatic or hydrogen poor fractions from the relatively more paraffinic or hydrogen rich fractions. In processes of this character, the oil and selective solvent are suitably contacted by various processes, as for example, by a single batch or by a multi-batch process. In general, the preferred operation is a countercurrent tower treating process in which the lighter phase, usually the oil, is introduced into the center or the bottom section of a countercurrent treating tower. The oil flows upwardly through the tower and contacts down flowing solvent which is introduced into the upper section of the tower. Efficient contact between the countercurrently flowing phases is secured by suitable means, as for example, by contact masses, distributing plates, pierced plates and the like.

The conditions of operation are optimally adjusted to secure desirable results and depend upon various factors, as for example, upon the particular solvent or solvent mixture being used, the oil being treated, and the yield and quality of the products desired. These processes are currently employed in the solvent treatment of petroleum oils in order to improve their quality and in order to segregate particularly desirable fractions. In treating these oils, solvents of the class which have a preferential selectivity for the more aromatic type compounds as compared to the more paraffinic type compounds are usually employed. Solvents of this class are, for example, phenol, furfural, sulfur dioxide, cresol, nitro benzene, aniline, beta beta dichlor diethyl ether, and the like. Mixtures of these solvents are also utilized, as well as substances of the class of liquefied normally gaseous hydrocarbons. Solvent modifying agents having the ability to modify the selectivity and solvent power of the solvent of the type of water, glycols, and alcohols are also employed. These latter materials may be added to the respective phases after separation or may be introduced into the countercurrent treating system at one or more points.

The solvent and the oil are contacted under conditions to form a solvent extract phase and a raffinate phase. The respective phases are separated and the solvent recovered from the raffinate and from the extract usually by distillation. However, when treating certain fractions of petroleum oils, it has heretofore not been practical to employ the solvent best adapted for securing the most desirable results due to the fact that the solvent could not be readily recovered from the treated oil since a portion of the treated oil was removed overhead with the selective solvent, resulting in decreased yields and impairment of the subsequent efficiency of the selective solvent. This has been a disadvantage since one solvent cannot be readily substituted for another in the treatment of petroleum oil fractions if yields and quality of products are to be maintained. In order to overcome this disadvantage, and to make possible the use of desirable solvents best adapted for the particular operation irrespective of the boiling range of the oil being treated, various methods have been suggested for the recovery of the selective solvent other than by distillation. For example, it has been suggested that the selective solvent be removed from the raffinate or from the extract by reextraction with a secondary solvent or that it be removed by washing and the like.

I have now discovered a process by which it is possible to completely separate the oil from the primary solvent by distillation even though portions of the oil being treated would normally be removed overhead with the selective solvent. The process of my invention may be readily understood by reference to the attached drawings illustrating modifications of the same. Figure 1 illustrates a process of the present invention in which an initial separation is made between the solvent and the extracted oil before removing the final traces of the extracted oil from the selective solvent by introducting a relatively higher boiling oil. Figure 2 illustrates a modification of the present invention in which the relatively higher boiling oil is added during the inital separation of the selective solvent from the extracted oil. Figure 3 illustrates a modification of the invention in which relatively higher boiling oils and relatively lower boiling oils are extracted with the same selective solvent and the raffinate and extract streams combined in order to secure optimum removal of the selective solvent from the extracted oils. For purposes of illustration, it is assumed that the feed oil being treated is a petroleum oil such as a gas oil, transformer oil, spindle oil or light motor oil distillate and that the selective solvent is monohydroxy phenol.

Referring specifically to Figure 1, feed oil is introduced into countercurrent treating tower 1 by means of feed line 2. This oil flows upwardly through tower 1 and contacts downflowing solvent which is introduced in the upper part of tower 1 by means of solvent feed line 3. Sufficient contact between the countercurrently flowing phases is secured by suitable means, as for example, by contact masses, distributing plates, pierced plates, and the like. Temperature and pressure conditions are maintained in tower 1 in order to secure the formation of a raffinate or solvent-poor phase and the formation of a solvent extract or solvent-rich phase. The selectivity and solvent power of the solvent may be modified by the addition of solvent modifying agents, as for example, water, alcohols, glycols, and the like. These materials may be introduced into the system by means of lines 4, 5, and 6. The respective phases are separated, the raffinate phase being removed from counter-current treating tower 1 by means of line 7 and the solvent extract phase by means of line 8. If desired, either the raffinate phase or the solvent extract phase may be cooled in coolers 9 and 10 and introduced into separators 11 and 12 respectively in which further phase separation would occur. Phase separation of either the raffinate phase or the solvent extract phase may also be secured by the addition of a suitable precipitant introduced by means of lines 13 and 14 respectively. The relatively less paraffinic phase separated in raffinate separator 11 may be returned to solvent treating tower 1 by means of line 15 or withdrawn by means of line 16 and treated in any manner desirable. The relatively less aromatic phase separated in solvent extract separator 12 may similarly be returned to solvent treating tower 1 by means of line 17 or withdrawn from the system by means of line 18 and treated in any manner desirable.

The relatively more aromatic phase is withdrawn from solvent extract separator 12, heated in heater 49, and introduced into still 19 by means of line 20. Conditions are maintained in still 19 to remove overhead the entire quantity of selective solvent by means of line 21 and to remove as bottoms solvent-free extract by means of line 22. Complete removal of the solvent from the bottoms is secured by stripping with steam which is introduced into still 19 by means of line 23. The overhead product removed from still 19 by means of line 21 comprising the selective solvent and certain low-boiling fractions of the extract, is introduced into still 24. This overhead fraction before introduction into still 24, is mixed with an additional quantity of relatively higher boiling oils which is introduced into line 21 by means of line 35. Temperature and pressure conditions are adapted to remove overhead from still 24 an oil free selective solvent by means of line 26, and to remove as bottoms by means of line 28 the extract oil removed overhead from still 19 and the relatively heavy oil introduced by means of line 35. The oil-free selective solvent removed overhead from still 24 by means of line 26 is introduced into solvent storage 27 from which it is recycled to countercurrent treating tower 1 by means of line 3. Fresh solvent may be introduced into the system by means of line 29. The hydrocarbon oil withdrawn as bottoms from still 24 by means of line 28 comprising extract oil removed overhead from still 19 and higher boiling oil introduced by means of line 35 may in certain instances be withdrawn from the system by means of line 50 and used as such, providing it is adaptable for commercial purposes. However, this oil is preferably introduced into still 30. Temperature and pressure conditions are maintained in still 30 to remove overhead the extract oil by means of line 31. The overhead extract oil removed by means of line 31 is combined with the extract oil removed by means of line 22 to form a total extract product which is withdrawn from the system by means of line 32. The relatively higher boiling oil is removed from still 30 by means of line 33 and introduced into higher boiling oil storage 34 from which it may be recycled by means of line 35. If the higher boiling oil is withdrawn from the system by means of line 50, fresh higher boiling oil may be introduced into the system by means of line 51.

In a similar manner the more paraffinic raffinate is withdrawn from raffinate separator 11 by means of line 25, heated in heater 52, and introduced into still 36. Still 36 is maintained under suitable temperature and pressure conditions to remove overhead by means of line 37 the entire quantity of selective solvent and to remove as bottoms by means of line 38 a solvent-free raffinate phase. Complete removal of the solvent from the raffinate may be secured by the introduction of steam by means of line 39. The overhead fraction removed from still 36 by means of line 37 is introduced into still 40. Before introducing said overhead fraction into still 40, an additional quantity of relatively high boiling oil is added to said fraction by means of line 41. Temperature and pressure conditions are maintained in still 40 to remove overhead an oil-free solvent by means of line 42 which is returned to solvent storage 27 by means of line 26 and recycled as described with respect to the solvent removed from the extract. Solvent-free bottoms comprising raffinate removed overhead from still 36 by means of line 37 and relatively higher boiling oil added by means of line 41 is withdrawn from still 40 by means of line 43 and introduced into still 44. Temperature and pressure conditions are maintained in still 44 to remove overhead by means of line 45 the raffinate oil removed overhead with the solvent from still 36. This raffinate removed overhead by means of line 45 is combined with the raffinate removed by means of line 38 to form a total raffinate product which is removed from the system by means of line 46. The relatively higher boiling oil is removed from still 44 by means of line 47 and returned to higher boiling oil storage 48 from which it is recycled to the system by means of line 41. Under certain conditions it may be desirable to withdraw from the system at least a portion of the oil fraction removed as bottoms from still 40 by means of line 53. If this operation be conducted, additional higher boiling oil may be introduced into the system by means of line 54.

Referring specifically to Figure 2, the solvent extract is removed from extract separator 12 by means of line 62 heated in heater 78, and introduced into still 63. Temperature and pressure conditions are maintained in still 63 to remove overhead by means of line 60 an oil-free selective solvent. The removal of oil-free solvent from still 63 is facilitated by the addition of a relatively higher boiling oil which is introduced into still 63 by means of line 61. Although the relatively higher boiling oil may be introduced directly into line 62 by means of line 79, the preferred operation is to introduce the relatively higher boiling oil into the upper section of still 63. Still 63 is equipped with suitable distributing or contacting plates in order to secure efficient contact between the upflowing phenolic vapors containing the relatively lower boiling oil and the downflowing relatively higher boiling oil. A solvent-free bottoms removed from still 63 comprising extract oil and the added relatively higher boiling oil is introduced into still 64 by means of line 65. Temperature and pressure conditions are maintained on still 64 to remove overhead by means of line 66 the extract product which is withdrawn from the system and to remove as bottoms by means of line 67 the relatively higher boiling oil. This oil is returned to higher boiling oil storage 68 from which it may be recycled to still 63 by means of line 61. The solvent removed overhead from still 63 by means of line 60 is returned to solvent storage 27 as described with respect to Figure 1. However, it is to be understood that oil comprising the extract and relatively higher boiling oil may be withdrawn from the system by means of line 80.

In a similar manner the more paraffinic phase withdrawn from raffinate separator 11 is heated in heater 81 and introduced into still 69 by means of line 70. Temperature and pressure conditions are maintained in still 69 to remove overhead by means of line 71 an oil-free solvent which is returned to solvent storage. The removal of oil-free solvent by means of line 71 from still 69 is facilitated by introducing into still 69 by means of line 72 a relatively higher boiling oil. The relatively higher boiling oil may be introduced into the raffinate phase by means of line 82, but is preferably introduced into the upper section of still 69. Still 69 comprises a suitable number of distributing and contacting plates in order to insure efficient contact between the countercurrently flowing phases. A solvent-free oil comprising raffinate oil and the relatively higher boiling oil introduced by means of line 72 is withdrawn from still 69 by means of line 73, heated in heater 83 and introduced into still 74. Temperature and pressure conditions are maintained in still 74 to remove overhead by means of line 75 the raffinate oil which is withdrawn from the system and to remove as bottoms by means of line 76 the relatively higher boiling oil. This relatively higher boiling oil is returned to higher boiling oil storage 77 from which it is recycled by means of line 72. It is to be understood that under certain conditions it may be desirable to withdraw the oil bottoms removed from still 69 by means of line 84 and to use this product as such. If this operation be employed, additional relatively higher boiling oil may be introduced into the system by means of line 85.

Referring specifically to Figure 3, a relatively low boiling oil is introduced into countercurrent treating tower 100 by means of line 101. This oil flows upwardly through tower 100 and contacts downflowing solvents which are introduced into tower 100 by means of line 102. Temperature and pressure conditions are maintained in tower 100 to secure the formation of a raffinate phase which is removed by means of line 103 and an extract phase which is removed by means of line 104. In a similar manner, a relatively higher boiling oil is introduced into countercurrent treating tower 105 by means of line 106 under conditions to countercurrently contact an additional quantity of the selective solvent which is introduced into tower 105 by means of line 107. Temperature and pressure conditions are adapted to secure the formation of a raffinate phase which is withdrawn by means of line 108 and a solvent extract phase which is withdrawn by means of line 109. The solvent extract phases of the relatively lower boiling oil and relatively higher boiling oil are combined and introduced into still 110 by means of line 111. Temperature and pressure conditions are maintained on still 110 to remove overhead an oil-free solvent by means of line 112 which is returned to solvent storage 113. The extract oil phase free of solvent comprising relatively higher boiling extract and relatively lower boiling extract is removed from still 110 by means of line 114 and introduced into still 115. Temperature and pressure conditions are adapted to remove overhead a low boiling extract by means of line 116 and to remove as bottoms higher boiling extract by means of line 117. These latter fractions are withdrawn from the system as final extract products. The relatively higher boiling oil raffinate and the relatively lower boiling oil raffinate removed by lines 103 and 108 are combined and introduced into still 118 by means of line 119. Temperature and pressure conditions are maintained in still 118 to remove overhead an oil-free solvent by means of line 120 which is returned to solvent storage 113. The relatively high boiling raffinate and the relatively low boiling raffinate free of solvent are withdrawn from still 118 by means of line 121 and introduced into still 122. Temperature and pressure conditions are maintained in still 122 to remove overhead said low boiling raffinate by means of line 123 and to remove as bottoms said high boiling raffinate by means of line 124. These raffinate streams are withdrawn from the system as final products.

A preferred modification of the present invention as illustrated by Figure 3 is to introduce the relatively low boiling extract into the bottom of still 110 by means of line 125 and to introduce the relatively high boiling extract into the upper section of still 110 by means of line 126. By operating in this manner, the relatively low boiling oil having a tendency to be removed with the selective solvent is removed by the heavier downflowing oil which is introduced into the upper section of the still and it has substantially no tendency to be removed overhead with the selective solvent. This operation may be readily secured by adjusting valves 127, 128, 129, and 130. In a similar manner, the preferred operation, with respect to the raffinate phases, is to introduce the relatively low boiling raffinate into the lower section of still 118 by means of line 131 and to introduce the relatively high boiling raffinate into the upper section of still 118 by means of line 132. Thus, the relatively low boiling raffinate having a tendency to be removed overhead with the solvent will contact downflowing relatively high boiling raffinate having no tendency to be removed overhead with the solvent. This operation may be readily secured by adjusting valves 133, 134, 135, and 136.

In order to further illustrate the invention, the following examples are given which should not be construed as limiting the same in any manner whatsoever:

*Example 1*

Several operations were conducted the results of which clearly illustrate the improvements secured by the present process.

In operation A a petroleum oil having an A. P. I. gravity of 20° was treated with phenol and the phenol separated from the respective phases by normal distillation operations. In operation B the phenol was separated from the respective phases in accordance with the present process, utilizing as the heavy addition oil a narrow cut petroleum fraction having an initial boiling point of above 800° F. and having a gravity of about 26° A. P. I. Identical treating conditions were employed in operation A and in operation B which comprised treating the oil with about 200% of aqueous phenol, employing a temperature gradient in the extraction system of from 173° F. to 140° F. The results of these operations were as follows:

|  | Charge stock | Raffinate operation A | Raffinate operation B |
|---|---|---|---|
| Inspections: | | | |
| Gravity—° A. P. I. | 20.9 | 26.3 | 27.0 |
| Flash—° F. | 395 | 390 | 395 |
| V/100 | 547 | 356 | 326 |
| V/210 | 55.4 | 52.1 | 51.1 |
| V. I. | 24 | 67.5 | 72 |

From the above data, it is readily apparent that a considerably higher quality product was secured under operation B.

An analysis was made of the phenol separated from the respective phases under operation A, resulting in the finding that it contained about 6% of a relatively light oil having the following inspections:

Boiling range of light oil, °F.

Initial ------------------------------------------ 440
25% ------------------------------------------ 520
50% ------------------------------------------ 560
75% ------------------------------------------ 725
90% ------------------------------------------ 770

It is to be noted that the initial boiling point of the oil contained in the phenol as an impurity is considerably above the boiling point of the phenol and that a considerable portion of said oil boils several hundred degrees above the boiling point of the phenol.

*Example 2*

The following data illustrates that the presence of a relatively high boiling hydrocarbon oil during the distillation step will repress the vaporization of a relatively lighter hydrocarbon to an extent that will permit the greater proportion of the solvent to be distilled substantially free of lighter hydrocarbon.

A sample of recovered phenol from a commercial phenol treating plant had a melting point of 102° F. and upon analysis was shown to contain 4% oil. This phenol was redistilled after about 50% by volume of a heavy oil having an initial boiling point in the range from about 800° F. to 900° F., a gravity of about 26° A. P. I., a flash of 570° F., and a viscosity of 152 at 210° F. was added. The results obtained were as follows:

| Cut | Percent of solvent distilled | Conventional distillation | | Distillation in the presence of 50% of heavy oil stock | |
|---|---|---|---|---|---|
| | | Oil | M. P. | Oil | M. P. |
| | | Percent | °F. | Percent | °F. |
| 1 | 0–25 | 2.0 | 102 | ¹1.0 | 103.5 |
| 2 | 25–50 | 2.0 | 102.5 | ¹1.0 | 104 |
| 3 | 50–75 | 2.5 | 102.5 | 1.5 | 104 |
| 4 | 75–92 | 4.0 | 100.5 | 5.5 | 101.5 |

¹ Less than.

These results clearly indicate the advantage of adding the heavy oil during the distillation step. In the case in which the heavy oil was added, at least 75% of the phenol could be removed by distillation in a form containing not over 1% oil and having a melting point of approximately 104° F. Without the residual oil, the first 75% distilled contained at least 2% oil and had a melting point of approximately 102° F.

The process of the present invention may be widely varied. Any modification may be adapted with respect to the treating system. The character of the heavy oil added will depend upon the oil being treated and also upon the particular solvent or solvent mixture being employed. The heavy oil added to facilitate the separation of the extract from the solvent should be highly aromatic in character while the heavy oil added to facilitate the separation of the raffinate from the solvent should be highly paraffinic in character.

Since the present invention is directed primarily to the removal of oil and impurities from phenol which impair its efficiency, the subsequent step of separating the relatively light oil from the relatively heavy oil is not of prime importance and under certain conditions no separation is made. However, in general, a preferred operation is to separate the lower boiling hydrocarbon oil from the relatively higher boiling hydrocarbon oil, in which case the boiling range of the heavy oil added should not overlap the boiling range of the lower boiling oil. Preferred results are secured if at least a 50° F. temperature difference exists between the final boiling point of the lower boiling oil contained in the solvent and the initial boiling point of the added heavy oil. The added oils preferably should be of the same character as the extracted oils in order to secure mutual solubility and to take advantage of partial pressure effects. The boiling range of the heavy oil added will likewise depend upon the particular operation being carried out. Although satisfactory results can be obtained with almost any boiling range heavy oil, provided it does not contain lower boiling fractions that would be distilled with the selective solvent, in general, the heavy oil added should be a narrow boiling fraction preferably substantially 100% of the oil boiling uniformly over a temperature range within 300° F.

The quantity of relatively higher boiling oil added will be a function, to a large extent, of the characteristics of a higher boiling oil, the characteristics of the relatively lower boiling oil and the amount of lower boiling oil present in the solvent. However, in general, the amount of relatively higher boiling oil should not exceed three volumes and preferably should be below one volume per volume of lower boiling oil present in the solvent separated from respective phases by usual distillation operations.

The present invention is not to be limited by any theory or mode of operation but only by the following claims in which it is desired to claim all novelty insofar as the prior art permits.

I claim:

1. The improvement in a solvent treating process for the removal of lower boiling oils normally taken overhead with the selective solvent in the removal of the selective solvent from the extracted oil by distillation which comprises adding to said selective solvent containing said lower boiling oil fractions after removal of the same from the extraction zone a relatively higher boiling oil, distilling said mixture under conditions to remove overhead said selective solvent and to remove as bottoms said relatively low boiling oil fractions and said added relatively high boiling oil fractions, subjecting said bottoms to a further distilling operation in order to separate the relatively low boiling oil fractions and the relatively high boiling oil fractions.

2. Process in accordance with claim 1 in which said added oil has an initial boiling point at least 50° F. above the final boiling point of said lower boiling fractions.

3. Solvent treating process comprising countercurrently contacting a petroleum oil and a solvent under conditions to form a raffinate phase and a solvent extract phase, said petroleum oil and solvent being of a character that upon subsequent distillation for the removal of solvent from the extracted oil, lighter boiling portions of the oil will be removed overhead with the selective solvent, separating the respective phases, distilling both of said phases to remove overhead said selective solvent containing a small amount of relatively lower boiling oil fractions, separating as bottoms from said distillation operation the larger portions of said extracted oils, adding to the selective solvent removed from the raffinate phase a highly paraffinic relatively high boiling petroleum oil, adding to the selective solvent separated from the extract phase a relatively high boiling highly aromatic petroleum oil, directly distilling the mixtures under conditions to separate said selective solvents free of oil, distilling the resulting paraffinic oil and the relatively aromatic oil to segregate a relatively low boiling extracted paraffinic fraction, a relatively high boiling paraffinic fraction, a relatively low boiling extracted aromatic fraction and a relatively high boiling aromatic fraction, recycling the relatively high boiling oil fractions to the system and combining the relatively low boiling paraffinic fraction with the larger portions of the raffinate removed as bottoms and the relatively low boiling aromatic fraction with the larger portions of the extract removed as bottoms.

4. Solvent treating process comprising extracting a relatively low boiling oil with a selective solvent, said relatively low boiling oil and solvent being of a character that an appreciable quantity of low boiling oil fractions will be removed overhead with said selective solvent upon distilling the same for the removal of said solvent from said extracted oil, comprising extracting a relatively high boiling oil with additional quantities of said selective solvent, said extractions being conducted under conditions to form raffinate and extract phases, separating the respective raffinate phases and combining the same to form one raffinate phase, separating the respective extract phases and combining same to form one extract phase, distilling said one raffinate phase and said one extract phase under conditions to remove overhead said selective solvent and to secure a solvent free raffinate and an extract phase, subjecting said phases to subsequent distillation operation under conditions to segregate a low boiling raffinate, a high boiling raffinate, a low boiling extract and a high boiling extract.

5. Solvent treating process comprising extracting a relatively low boiling oil with a selective solvent, said relatively low boiling oil and solvent being of the character that an appreciable quantity of low boiling oil fractions will be removed overhead with said selective solvent upon distilling the same for the removal of said solvent from said extracted oil, comprising extracting a relatively high boiling oil with additional quantities of said selective solvent, said extractions being conducted under conditions to form raffinate and extract phases, separating the respective raffinate phases, introducing said raffinate phases in a distillation tower in a manner in which the higher boiling raffinate is introduced into the upper section of said tower and the lower boiling raffinate is introduced into the lower section of said tower, maintaining conditions in said tower to remove overhead oil-free solvent and to remove as a bottoms solvent-free raffinate, separating the respective extract phases and introducing the same into a distillation tower in a manner in which the higher boiling extract is introduced into the upper section of said tower and the lower boiling extract is introduced into the bottom of said tower, maintaining temperature and pressure conditions in said tower to remove overhead an extract-free solvent and to remove as a bottoms solvent-free extract.

6. Process in accordance with claim 5 in which said solvent-free raffinate is further distilled in a manner to segregate a relatively low boiling raffinate and a relatively high boiling raffinate.

7. Process in accordance with claim 5 in which said solvent-free extract is further distilled in a manner to segregate a relatively low boiling extract and a relatively high boiling extract.

8. Improved process for the recovery of an oil free selective solvent from a raffinate or extract phase secured by contacting a feed oil with a selective solvent, the boiling range of which is such that relatively lower boiling constituents of the treated oil are removed overhead with the solvent upon distillation of the phase for the segregation of the treated oil and solvent which comprises distilling at least one phase in an initial distillation zone under conditions to remove as a bottoms a solvent free treated oil, and to remove as an overhead product the selective solvent and a small amount of the relatively lower boiling constituents of the treated oil, adding to said overhead fraction from said initial distillation zone an oil boiling appreciably above the boiling range of the treated oil, distilling the mixture in a secondary distillation zone under conditions to remove as an overhead product an oil free selective solvent, and to remove as a bottoms a solvent free oil product comprising treated oil and the added relatively high boiling oil, distilling said bottoms product from the secondary distillation zone under conditions to remove as a bottoms product the added heavy oil and to remove as an overhead product treated oil, recycling the bottoms product from the tertiary distillation zone to the feed to said secondary distillation zone, and combining the overhead product from said tertiary distillation zone with the bottoms product from said initial distillation zone.

FREDERICK W. SCHUMACHER.